(12) United States Patent
Monk et al.

(10) Patent No.: US 8,123,235 B2
(45) Date of Patent: Feb. 28, 2012

(54) HYDRAULIC SYSTEM FOR A VEHICLE SUSPENSION

(75) Inventors: Richard Monk, Busselton (AU); James Lind Taylor, Leuven (BE)

(73) Assignee: Kinetic Pty. Ltd., Dunsborough (AU)

(*) Notice: Subject to any disclaimer, the term of this patent is extended or adjusted under 35 U.S.C. 154(b) by 524 days.

(21) Appl. No.: 11/885,498

(22) PCT Filed: Mar. 1, 2006

(86) PCT No.: PCT/AU2006/000265
§ 371 (c)(1),
(2), (4) Date: May 19, 2008

(87) PCT Pub. No.: WO2006/092013
PCT Pub. Date: Sep. 8, 2006

(65) Prior Publication Data
US 2008/0272561 A1    Nov. 6, 2008

(30) Foreign Application Priority Data

Mar. 1, 2005 (AU) ................ 2005900943

(51) Int. Cl.
*B60G 17/015* (2006.01)
(52) U.S. Cl. .......... 280/5.5; 280/5.507; 280/124.161; 280/124.162
(58) Field of Classification Search ............. 280/5.5, 280/5.507, 5.508, 5.513, 124.157, 124.16, 280/124.161, 124.162
See application file for complete search history.

(56) References Cited

U.S. PATENT DOCUMENTS

| | | | |
|---|---|---|---|
| 3,032,349 A | | 5/1962 | Fiala |
| 3,752,497 A | * | 8/1973 | Enke et al. ............ 280/5.509 |
| 5,486,018 A | * | 1/1996 | Sakai ................ 280/124.16 |
| 5,556,115 A | | 9/1996 | Heyring |
| 5,601,306 A | | 2/1997 | Heyring et al. |
| 6,519,517 B1 | | 2/2003 | Heyring et al. |

(Continued)

FOREIGN PATENT DOCUMENTS

AU    70599/96 A    5/1997

(Continued)

OTHER PUBLICATIONS

Search Report dated Apr. 3, 2009 in corresponding patent application No. PCT/AU2006/000265.

(Continued)

*Primary Examiner* — Eric Culbreth
(74) *Attorney, Agent, or Firm* — Harness, Dickey & Pierce, PLC

(57) ABSTRACT

A vehicle hydraulic suspension system has front left (15), front right (16), rear left (18) and rear right (17) wheel ram. There is a mode decoupling device (100) with first (129), second (130), third (132) and fourth (131) balance chambers formed by a cylinder/piston rod assembly (124,125,126). The compression chamber (45) of the front left wheel ram (15) is in fluid communication with the first balance chamber (129), the compression chamber (46) of the front right wheel ram (16) is in fluid communication with the second balance chamber (130), the compression chamber (48) of the rear left wheel ram (18) is in fluid communication with the third balance chamber (132), and the compression chamber (47) of the rear right wheel ram (17) is in fluid communication with the fourth balance chamber (131). There are also front and rear resilient vehicle support means between vehicle body and the wheel assemblies.

41 Claims, 7 Drawing Sheets

U.S. PATENT DOCUMENTS

2004/0061292 A1  4/2004  Hall
2005/0225050 A1  10/2005  Mizuno

FOREIGN PATENT DOCUMENTS

| DE | 3426734 A1 | 8/1985 |
| EP | 1 426 212 | 6/2004 |
| EP | 1 584 503 | 10/2005 |
| FR | 2663267 A1 | 12/1991 |
| WO | WO 2004/052667 | 6/2004 |
| WO | WO-2004/052667 A1 | 6/2004 |
| WO | WO 2004/076211 | 9/2004 |

OTHER PUBLICATIONS

Office Action in corresponding Chinese patent application No. 200680006462.8 dated Feb. 6, 2009 with English translation.

Office Action dated May 31, 2011 from the Japenese Patent Office in corresponding Japanese Patent Application No. 2007-557281 with English translation.

* cited by examiner

HYDRAULIC SYSTEM FOR A VEHICLE SUSPENSION

FIELD OF THE INVENTION

The present invention is generally directed to suspension systems for vehicles, and in particular to a hydraulic system providing control of one or more suspension parameters.

BACKGROUND OF THE INVENTION

There are known many alternate interconnected suspension systems which have the ability to passively differentiate between different modes of wheel motion with respect to the vehicle body and therefore provide a variety of alternatives in functionality. For example, French patent publication number FR 2 663 267 discloses a hydro-pneumatic suspension system which supports the vehicle body and provides different heave and roll stiffness rates with zero warp stiffness. The pitch stiffness is related to the heave stiffness (which is determined by the rod diameters, accumulator sizes and ram positions front and rear). Since this system supports the vehicle, the pressures in the four fluid volumes must be high, or the rod diameters large to provide the support force for the vehicle, which leads to seal friction and significant ride comfort limitations. Furthermore, as the temperature changes, the volumes of gas and fluid in the system cause ride height changes, requiring a costly high pressure fluid supply and control system. Also, the pressure in each of the four fluid volumes must be individually correct to provide the required support at each wheel, so the pressures are usually different, leading to control complexity, leakage past the piston seals between the fluid volumes and increase in piston seal friction.

Similarly, the applicant's U.S. Pat. No. 6,270,098 provides a pressure balancing "load distribution" unit between two pairs of diagonally interconnected double acting wheel rams. This system provides different heave, roll and additionally pitch stiffness rates with zero warp stiffness and different damping rates in all four base suspension modes (heave, roll pitch and warp). Since this system also supports the weight of the vehicle, as the loads on the vehicle change, or as the fluid temperature changes, the volume of fluid in each of the six volumes in the system must be adjusted. Also, as the six volumes in the system can, in some load conditions, all be at different pressures, there is the possibility for fluid to leak across seals, which also requires fluid volume adjustments to be made to maintain the correct vehicle attitude. This requires a high pressure fluid source, sensors, control electronics and valves, making the cost of the system relatively high for a passive system.

Likewise in EP 1 426 212 and International Application Number PCT/EP2004/004885 there are disclosed a number of passive hydraulic systems providing support of the vehicle and roll stiffness with zero warp stiffness. As these hydraulic systems provide support of the vehicle they have similar disadvantages to the applicant's aforementioned U.S. Pat. No. 6,270,098.

An example of a passive system providing high roll stiffness with low warp stiffness and negligible heave stiffness and providing high roll damping with lower, more comfortable and isolating heave damping can be found in the applicant's U.S. Pat. No. 6,761,371. As the system does not provide significant heave stiffness, separate support springs are required. The roll moment distribution required of the hydraulic system drives the selection of wheel ram sizes and can lead to compromises in peak damping force.

An example of a system having just roll and/or pitch damping can be found in U.S. Pat. Nos. 5,486,018 and 6,024,366. The system in these documents uses a device between a pair of wheel damping rams, each wheel damping ram having a damper valve in its piston to provide double-acting damping but make the ram single-acting (i.e. there is only a single fluid port). The device provides for independent levels of damping for in-phase (i.e. heave) and out of phase (i.e. roll and/or pitch) motions. However this system does not provide significant stiffness in any mode, so in addition to the need for support springs, generally anti-roll bars will be required for a good balance between bounce and roll stiffness rates front and rear. Additionally, as the wheel rams are effectively single acting (having only one fluid port) the amount of damping that the device can provide is limited. There are improvements made to the system to combat this problem, which can be found in Japanese patent office publication number 11291737, but these add to the complexity of the system by providing more plumbing and spool valves.

It is therefore an object of the present invention to provide a hydraulic system for a vehicle suspension that alleviates at least one of the disadvantages of earlier vehicle suspension systems.

It is a preferred object of the present invention to provide a hydraulic system having roll stiffness, roll damping, and heave damping, the roll moment distribution of which can be configured and tuned substantially independently from the wheel damping pressures.

SUMMARY OF THE INVENTION

With this in mind, according to one aspect of the present invention there is provided a suspension system for a vehicle, the vehicle including a vehicle body and at least two forward and two rearward wheel assemblies, the suspension system including a hydraulic system, the hydraulic system including:

at least one front left, at least one front right, at least one rear left and at least one rear right wheel ram each located between a respective said wheel assembly and the vehicle body, each wheel ram including at least a compression chamber; and a mode decoupling device, the device including first, second, third and fourth balance chambers formed by an arrangement of at least two cylinder portions and a piston rod assembly, the first and fourth balance chambers varying in volume in the same direction as each other with motion of the piston rod assembly, the third and second balance chambers varying in volume in the same direction as each other and in the opposite direction to the first and fourth balance chambers with motion of the piston rod assembly;

wherein the compression chamber of the front left wheel ram is in fluid communication with the first balance chamber of the mode decoupling device forming a front left fluid volume, the compression chamber of the front right wheel ram is in fluid communication with the second balance chamber forming a front right fluid volume, the compression chamber of the rear left wheel ram is in fluid communication with the third balance chamber forming a rear left fluid volume and the compression chamber of the rear right wheel ram is in fluid communication with the fourth balance chamber of the mode decoupling device forming a rear right fluid volume, wherein the piston rod assembly of the mode decoupling device operates to proportion fluid pressure during roll motions of the vehicle, and operates to distribute fluid between the respective fluid volumes during warp and optionally during roll motions; and wherein the suspension system further includes front and rear resilient vehicle support means between the vehicle body and the wheel assemblies for resiliently supporting the vehicle above the wheel assemblies.

Thus, advantageously, roll motions of the vehicle are resisted by the hydraulic system while warp motions of the wheels relative to the vehicle body are permitted by the hydraulic system. The mode decoupling device proportions pressure in roll to provide roll resistance, yet distributes fluid in warp allowing transfer of front roll fluid displacement to the rear for opposite direction rear roll displacement (i.e. warp).

The hydraulic suspension system according to one or more forms of the present invention allows for independent tuning and configuration of suspension parameters including roll stiffness, roll moment distribution, roll damping and heave damping. This enables optimisation of as many of these suspension parameters as required.

The vehicle may preferably be primarily supported by the resilient vehicle support means. The advantages of the hydraulic system providing little or no support of the vehicle body are numerous: the operating pressure of the system can be reduced which reduces seal friction and improves ride comfort; the operating pressure of each of the four fluid volumes can be common which reduces the pressure differential across piston seals and therefore reduces control complexity, friction, improves ride comfort and reduces any potential leakage across piston seals between the four fluid volumes; the rod diameter of each ram can be much reduced, which provides a reduction in seal friction and improves ride comfort; the reduction in rod diameter permits a reduction in cylinder bore diameter which reduces fluid mass acceleration effects and improves ride comfort; and the hydraulic system can be designed to supply a portion of the support for one or both ends of the vehicle without providing a warp stiffness and can be used to compensate for loads applied to the vehicle. Indeed if the rear ram rods are of larger diameter than the front ram rods then as a load is added towards the rear of the vehicle, compressing the resilient vehicle support means, the pressure may be increased in the hydraulic system, providing more load compensation at the rear. At the same time if the roll moment distribution of the resilient vehicle support means is towards the front of the vehicle, and the roll moment distribution of the hydraulic system is less front biased, then as the pressure and stiffness of the hydraulic system is increased, the vehicle total suspension roll moment distribution may move rearwards to better match the requirement with a rearward positioned load.

The vehicle support means may be any known support means such as coil springs, air springs, torsion bars, leaf springs and rubber cones. The vehicle support means can, in the case of coil springs and air springs, be mounted around the wheel rams or mounted separately.

The vehicle support means for at least one end of the vehicle may include first support means for providing support for at least a portion of the load on the vehicle, the first support means providing a roll stiffness.

The vehicle support means for at least one end of the vehicle may include second support means for providing support for at least a portion of the load on the vehicle, the second support means providing substantially zero roll stiffness.

Any combination of the first and second support means may be provided at one or both ends of the vehicle. For example, if second support means are used at both ends of the vehicle without any first support means, then the suspension system provides zero warp stiffness. Therefore, when traversing uneven terrain, the load on each wheel remains constant (excluding the transient effects of any dynamic motions on wheel loadings).

The front wheel rams may be double-acting and therefore include a rebound chamber, the compression chamber of one front wheel ram being in fluid communication with the rebound chamber of the laterally adjacent wheel ram.

The rear wheel rams may be double-acting and therefore include a rebound chamber, the compression chamber of one rear wheel ram being in fluid communication with the rebound chamber of the laterally adjacent wheel ram.

Alternatively, one or both of the front and/or rear pairs of wheel rams may be single-acting, although even if the rams are single acting in effect for stiffness, it may be desirable to utilise a double-acting ram including a rebound chamber connected through a damper valving arrangement to the compression chamber. This can be achieved using a damper valve in the ram piston. The compression chamber may be connected to one of the balance chambers of the mode decoupling device as described above.

Damping means may be provided for damping the flow of fluid into and/or out of at least one chamber of each wheel ram.

At least one fluid pressure accumulator may be provided for each fluid volume, each accumulator being in fluid communication with the respective fluid volume. Damping means may be provided for damping the flow of fluid into and/or out of at least one accumulator.

Resilient means may be provided acting on the piston rod assembly of the mode decoupling device.

The mode decoupling device may include two cylinder portions and the piston rod assembly may include two pistons and at least one rod.

The mode decoupling device may include three cylinder portions and the piston rod assembly may include a first central piston and at least two rods. The piston rod assembly may further include two end pistons. Alternatively or additionally, the mode decoupling device may include a second central piston, the first and second central pistons forming at least one fluid pressure chamber. At least one additional fluid pressure accumulator may be provided in fluid communication with the at least one fluid pressure chamber.

The diameter of the cylinder portions may be dissimilar and the diameter of the rods may be dissimilar.

Preferably, since the vehicle support means are the primary means of vehicle support, all of the volumes in the hydraulic system may be run at the same pressure. Also, as the system contains hydraulic fluid and gas, both of which expand with increasing temperature, a pressure compensation arrangement may be required in order to maintain the system static pressure and roll stiffness within a design range over the design temperature. This pressure compensation arrangement may also be used to compensate for any fluid loss over time. Therefore, there is provided a pressure maintenance device connected to at least two, preferably each, of the fluid volumes through respective restrictions or valves.

The pressure maintenance device may be a simple accumulator connected through a restriction to each fluid volume. Alternatively the pressure maintenance device may include a pump, tank and fluid flow control devices. The pressure may be controlled to be different in the left fluid volumes to the right fluid volumes to provide roll attitude control, either at low frequency, or actively at higher frequency. Similarly the pressure may be controlled to be different in the front fluid volumes to the rear fluid volumes to provide pitch angle control (if the rod diameters are sufficient to provide meaningful changes in push out force).

At least one valve may be provided between the left fluid volumes and at least one valve may be provided between the right fluid volumes to bypass the effect of the mode decoupling device. This may be used to change the roll moment distribution of the hydraulic system whilst still providing roll stiffness with substantially zero warp stiffness. Alternatively or additionally, it may be used to equalise the associated pressures as part of a pressure maintenance function.

Additionally or alternatively, at least one valve may be provided between the front fluid volumes and/or at least one valve may be provided between the rear fluid volumes for removing the roll stiffness of the hydraulic system.

Additionally or alternatively, valves may be provided between the mode decoupling device and the wheel rams to provide a failsafe function or limit wheel lift.

The accompanying drawings illustrate preferred embodiments of the present invention. Other arrangements are possible, and consequently the particularity of the accompanying drawings is not to be understood as superseding the generality of the preceding description of the invention.

DESCRIPTION OF PREFERRED EMBODIMENT

Figure 1:
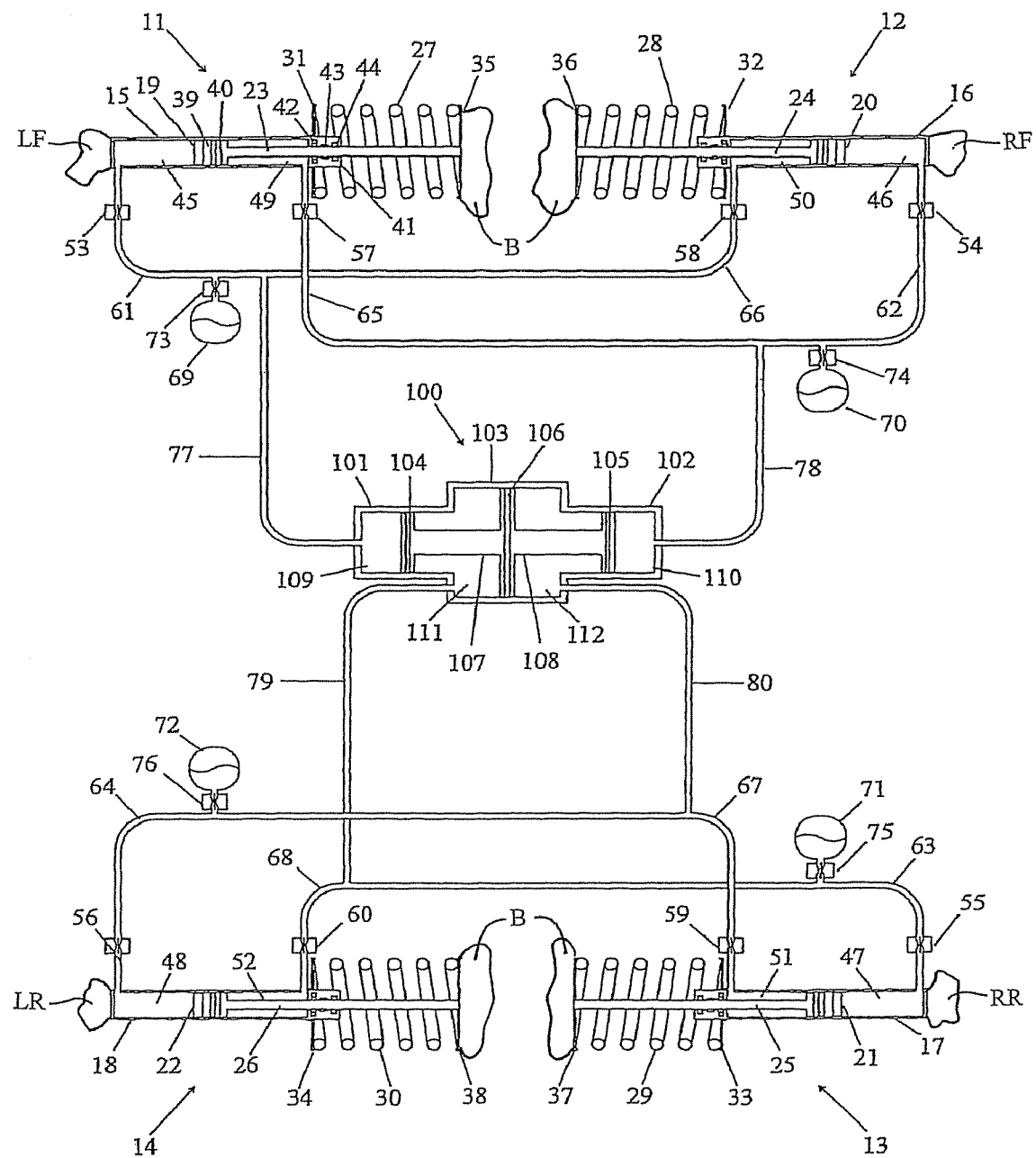
FIG. 1 is a schematic view of a first preferred embodiment of a hydraulic system having roll stiffness and roll damping, according to the present invention.

Referring initially to FIG. 1, there is shown a suspension system for a vehicle. Four wheel rams (11, 12, 13, 14) are located between the vehicle body B (shown schematically) and four orthogonally disposed wheels LF (left front), RF (right front), LR (left rear), RR (right rear) (shown schematically) of the vehicle. Each wheel ram includes a cylinder (15, 16, 17, 18) connected to a wheel hub or other suspension geometry to move with the wheel, a piston (19, 20, 21, 22) slidably housed within the cylinder, and a rod (23, 24, 25, 26) fixed between the piston and the body of the vehicle. The connection of the rod to the vehicle body may be by any known means, usually through a rubber bushing which in the case of MacPherson strut geometry usually includes a bearing.

For ease of understanding, the vehicle resilient support means are shown as "coil-overs", i.e. coil springs (27, 28, 29, 30) positioned around the wheel ram and located between a lower spring plate (31, 32, 33, 34) fixed to the cylinder and an upper spring plate (35, 36, 37, 38) which may be connected to the vehicle body or the rod (directly or indirectly such as via a bearing or bushing). It should be understood that the resilient support means may be of any alternative known type such as for example air springs and may be located around the cylinder as shown with the coil springs or separate to the ram, which broadens the alternatives, for example, to torsion bars connected to the geometry providing wheel location. The resilient support means may provide support and some roll stiffness (such as with independent torsion bars or coil springs for each wheel) or they may provide support with zero roll stiffness (such as with air springs, hydraulic cylinders or torsion bars connected between laterally adjacent wheels) or any combination of support means may be used with and without roll stiffness at one or both ends of the vehicle. This type of variation of support means for use with a separate roll control system are described in detail in the applicant's U.S. Pat. No. 6,217,047, details of which are incorporated herein by reference.

Also the wheel ram may be inverted with the cylinder portion connected to the vehicle body and the piston rod connected to the wheel hub or other suspension geometry to move with the wheel. This has the advantage that the fluid connections between the cylinder and the remainder of the hydraulic system are located relative the vehicle body rather than relative to the wheel, thereby reducing the displacement required of the hoses providing said fluid connections. In this case, and especially if the support springs are positioned around the wheel ram, the cylinder 15 can be slidably and rotatably mounted inside an outer tube, the rod being fixed to the outer tube which can in turn be connected to the wheel hub or other suspension geometry. The outer tube also can support the lower spring plate—the upper spring plate then being mounted either to the cylinder or directly to the body.

The wheel rams shown in the figures are basically conventional double-acting rams for simplicity. Taking the front left wheel ram 11 as an example, the piston 19 (which may be formed as an integral part of the rod 23) has two grooves containing a bearing 39 and a seal 40. In some cases, the individual bearing and seal parts can be replaced by a single item (not shown) which may be bonded to or formed around the piston for ease of assembly and low cost. The cylinder end (41) has three grooves containing a rod seal 42, a bearing 43 and a rod wiper 44 or other form of balance seal such as an excluder. Each ram therefore has a compression chamber (45, 46, 47, 48) and a rebound chamber (49, 50, 51, 52) formed by the piston (19, 20, 21, 22) within each cylinder (15, 16, 17, 18).

The direct damping of each wheel ram can be accomplished by the provision of compression (53-56) and rebound (57-60) damper valves mounted on conduits (61-68) close to the compression and rebound chambers of each wheel ram. These wheel damper valves can be single-acting, working on restricting fluid flow out of either a compression or a rebound chamber, or they may be double acting, in which case only one valve (on either the compression or preferably on the rebound chamber) may be utilised. The wheel damper valves can be located in the wheel ram body where there is package space, or attached to the wheel ram body or in the conduits as shown. The wheel damper valves may be of any known type including simple passive orifices, multi-stage passive orifice and shim based damper valves with optional blow-off springs, switched damper valves (controlled either between selectable settings such as comfort, normal and sport, or in dependence on steering and other inputs) or controlled continuously variable damping which can include algorithms to control wheel hop and whole body motions.

The four double-acting wheel rams are cross-connected in pairs front and rear forming front and rear fluid circuits, each comprising a left and a right fluid volume. The front left fluid volume is formed by the front left compression chamber 45, front left compression conduit 61, front right rebound conduit 66 and front right rebound chamber 50. The front right fluid volume is formed by the front right compression chamber 46, front right compression conduit 62, front left rebound conduit 65 and front left rebound chamber 49. Similarly, the rear left fluid volume is formed by the rear left compression chamber 48, rear left compression conduit 64, rear right rebound conduit 67 and rear right rebound chamber 51 and the rear right fluid volume is formed by the rear right compression chamber 47, rear right compression conduit 63, rear left rebound conduit 68 and rear left rebound chamber 52.

Accumulators 69, 70, 71 and 72 are shown on each of the fluid volumes to provide resilience in the hydraulic system. Each accumulator should be positioned along the compression or rebound conduits at any point between the compression and rebound wheel damper valves if provided. Accumulator damper valves 73, 74, 75 and 76 provide damping of the fluid flow between each fluid volume and the respective accumulator.

With the above described simple front and rear pair of fluidly connected wheel rams, the fluid displacement in different modes would be as follows:

a) in roll, when the vehicle is cornering to the right, centrifugal forces act on the body towards the left and the vehicle body rolls to the left, displacing fluid out of both the front left compression chamber and the front right rebound chamber into the front left accumulator 69 and out of the rear left compression chamber and rear right rebound chamber into the rear left accumulator 72. There is also an ingress of fluid into the front right compression chamber and the front left rebound chamber, supplied by the front right accumulator 70 and into the rear right compression chamber and the rear left rebound chamber, supplied by the rear right accumulator 71.

b) in warp, for example when the front left and rear right wheels are on higher ground than the front right and rear left wheels, then there is an excess of fluid in the front left and rear right fluid volumes and a demand for more fluid in the front right and rear left fluid volumes.

c) in heave and pitch the difference between the fluid displaced into or out of the compression chamber of one wheel ram and the fluid displaced out of or into the rebound chamber of the laterally adjacent wheel ram is equal to the rod volume displaced in the motion. This rod volume is all that is displaced into or out of the accumulators in heave and pitch motions.

The high relative volume displaced in the roll mode relative to the heave and pitch modes gives a higher roll stiffness than heave and pitch stiffness. It also means that if damper valves are used to damp the flow of fluid into and/or out of the accumulators, this damping has a greater effect in roll than in heave or pitch.

Therefore, the larger the difference between the cylinder diameter and the rod diameter of each cylinder, the larger the ratio between the roll (and warp) stiffness (and damping) of the system and the heave (and pitch) stiffness (and damping) of the system.

Furthermore, as the coil springs or other support means independent of the hydraulic system provide a large portion of the support for the load on the vehicle, the rod diameters can be small as the push out force from the cylinders can be low. Similarly the operating pressure of the hydraulic systems can be low, although it is generally set high enough to avoid cavitation in normal driving conditions at any point in the system.

Each of the four fluid volumes additionally includes a respective connecting conduit 77, 78, 79 and 80 to provide fluid communication between the four fluid volumes and a mode decoupling device. By connecting all four wheels together in one hydraulic arrangement, it is possible to passively differentiate between roll and warp motions. The advantage of using the mode decoupling device is that the wheel cylinders can be of a common diameter and the effective areas within the mode decoupling device can be used to proportion the roll moment distribution of the hydraulic system as required front to rear for handling balance.

The mode decoupling device 100 in FIG. 1 comprises three cylinder portions, two of the cylinder portions 101 and 102 being of the same diameter and positioned at either end of the central cylinder portion 103 which is of different diameter. A piston is slidably mounted inside each cylinder portion, the two end pistons (104, 105) being fixed to the central piston 106 by respective rods 107 and 108. This arrangement forms four chambers, the front left balance chamber 109 being connected to the front left fluid volume, the front right balance chamber 110 being connected to the front right fluid volume, the rear right balance chamber 111 being connected to the rear right fluid volume and the rear left balance chamber 112 being connected to the rear left fluid volume. This connectivity ensures that roll motions are resisted and warp motions are freely permitted whilst leaving the pitch and heave characteristics of the front and rear fluid circuits unaffected.

It should be readily appreciated that any layout of fluid conduits which provide an equivalent connectivity could be used. For example, the front left connecting conduit 77 may be omitted and the front left compression conduit 61 and the front right rebound conduit 66 may both be directly and individually connected to the front left balance chamber 109 of the mode decoupling device 100.

With the inclusion of the mode decoupling device 100, the fluid displacement in different modes can now be described as follows:

a) in roll, when the vehicle is cornering to the right, centrifugal forces act on the body towards the left and the vehicle body rolls to the left, displacing fluid out of both the front left compression chamber and the front right rebound chamber into the front left accumulator 69 and out of the rear left compression chamber and rear right rebound chamber into the rear left accumulator 72. There is also an ingress of fluid into the front right compression chamber and the front left rebound chamber, supplied by the front right accumulator 70 and into the rear right compression chamber and the rear left rebound chamber, supplied by the rear right accumulator 71. The increase in pressure in the front left and rear left balance chambers (109 and 112) of the mode decoupling device 100 is reacted to by the rod 107 and the decrease in pressure in the front right and rear right balance chambers (110 and 111) of the mode decoupling device is similarly reacted to by the rod 108. In roll a force balance is maintained across the piston rod assembly of the mode decoupling device (the assembly of the pistons 104, 105 and 106 and the rods 107 and 108) with little or no motion and the roll reacting loads generated by the hydraulic system are proportioned front to rear as determined by the cylinder sizes.

b) in warp, when the front left and rear right wheels are on higher ground than the front right and rear left wheels, the excess fluid in the front left and rear right fluid volumes enters chambers 109 and 111 of the mode decoupling device and shunts the piston rod assembly (ie the pistons 104, 105 and 106 and the rods 107 and 108) towards the right, expelling fluid from chambers 110 and 112 into the front right and rear left fluid volumes where the drooping of the wheels has created a demand for more fluid. As long as the roll moment distribution of the hydraulic system front to rear is matched to the wheel travel in the warp mode rear to front, then the pressures in the four fluid volumes should not change.

c) in heave and pitch the difference between the fluid displaced into or out of the compression chamber of one wheel ram and the fluid displaced out of or into the rebound chamber of the laterally adjacent wheel ram is equal to the rod volume displaced in the motion. This rod volume is all that is displaced into or out of the accumulators in heave and pitch motions. In pure heave and pitch motions the forces on the pistons (104, 105 and 106) and rods (107 and 108) of the mode decoupling device remain balanced, with the mode decoupling device providing no affect in these modes.

Therefore the hydraulic system provides a roll stiffness but does not provide a warp stiffness. If accumulator dampers are provided, they similarly provide the hydraulic system with roll damping without contributing warp damping. The roll stiffness of the hydraulic system is distributed front to rear at a constant roll moment distribution (RMD) which is determined by the front and rear wheel ram sizes, accumulator gas volumes and mechanical advantages, but can also be determined by the effective areas of the pistons in the mode decoupling device. Thus the mode decoupling device can be used to generate the required RMD whilst using wheel ram components of common sizes. In production, selecting from a range of standard diameters for the wheel rams and mode decoupling device can permit fine tuning of the system RMD. Alternatively, the range of wheel ram sizes could be restricted if peak wheel damping pressures are critical to meet design requirements, then a larger proportion or even all of the RMD tuning can be done using different effective piston areas in the mode decoupling device. The heave and pitch stiffness of the hydraulic system are due to the two-wheel parallel bump input stiffness of the front and rear circuits which is set relative to the roll stiffness of the hydraulic system by the diameter of the wheel ram cylinder bores and the wheel ram cylinder rods.

A further option available for tuning the RMD of the hydraulic system whilst still providing the desired overall vehicle RMD is to use support means with different degrees of roll stiffness as described above. For example, to enable a vehicle with a forwards biased vehicle RMD of 65% to use more even size wheel ram components and generate a similar peak damping pressure in the front and rear wheel ram chambers, the RMD of the vehicle support means can be chosen to give an acceptable hydraulic system RMD. It may be desirable to set the support means RMD to be the same as the required overall vehicle RMD of 65%, in which case, the front support means may be independent coil springs and the rear support means may be a combination of independent coil springs and laterally connected torsion bars.

Figure 2:
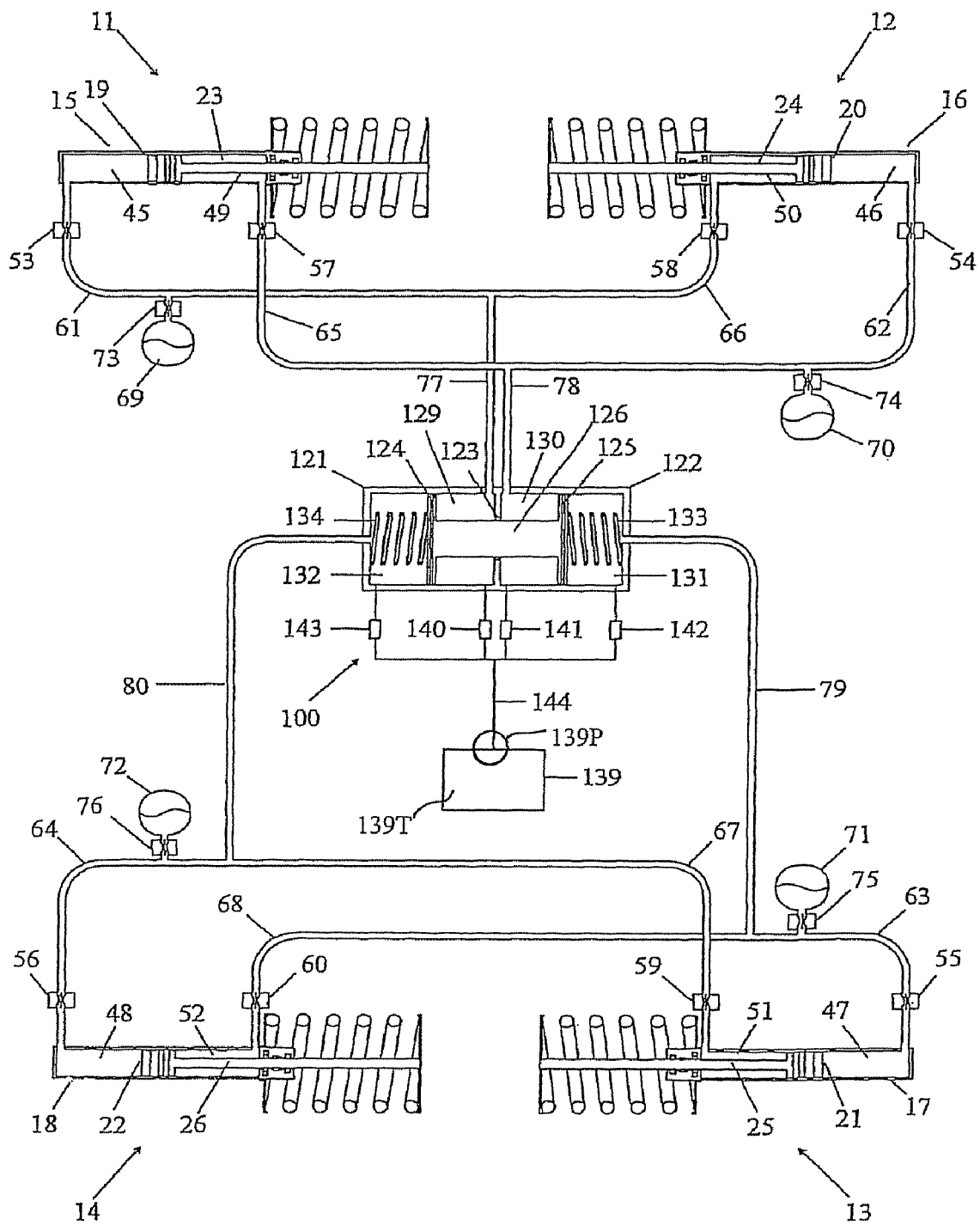
FIG. 2 is a schematic view of a second preferred embodiment of a hydraulic system according to the present invention and further includes a pressure maintenance device.

FIG. 2 shows an alternative construction of the mode decoupling device 100 within a similar hydraulic arrangement of interconnected wheel rams. In this case, the mode decoupling device 100 comprises two primary chambers 121 and 122, formed by a fixed wall 123. A piston is slidably mounted in each primary chamber forming four balance chambers, the two pistons 124 and 125 being fixed to a common rod 126, the rod passing through the fixed wall 123 which includes a rod seal.

The four balance chambers are, as in FIG. 1, a front left balance chamber 129 which is connected to the front left fluid volume connecting conduit 77 and the remainder of the front left fluid volume, the front right balance chamber 130 being connected to the front right fluid volume connecting conduit 78 and the remainder of the front right fluid volume, the rear right balance chamber 131 being connected to the rear right fluid volume connecting conduit 79 and the remainder of the rear right fluid volume and the rear left balance chamber 132 being connected to the rear left fluid volume connecting conduit 80 and the remainder of the rear left fluid volume As in FIG. 1, this connectivity in FIG. 2 ensures that roll motions are resisted and warp motions are freely permitted whilst leaving the pitch and heave characteristics of the front and rear fluid circuits unaffected.

In the configuration of mode decoupling device shown in FIG. 2, the balance chambers 131 and 132 at the ends of the device have a larger effective piston area than those chambers 129 and 130 adjacent the fixed wall 123. If additional rods (not shown) are provided through chambers 131 and 132, then the mode decoupling device can be made with any desired effective piston area, although the additional seals between the additional rods and the end walls of the mode decoupling device generally add friction and can have a detrimental effect on ride comfort. Similarly, if two balance chambers 121 and 122 are used, having respective pistons 124 and 125, with a rod 126 between the pistons and an additional rod extending through one of the end balance chambers, then again the mode decoupling device and be made with any desired effective piston area for each chamber by selection of different primary chamber diameters and different rod diameters.

If, due to the RMD of the hydraulic system, the front fluid volume connecting conduits need to be a much different size to the rear fluid volume connecting conduits for acceptable fluid velocity and acceleration effects, then it can be advantageous to position the mode decoupling device towards one end of the vehicle. The size of the compression and rebound conduits in the front and rear fluid circuits can also be sensitive to the position of the mode decoupling device, making its position longitudinally in the vehicle significant in the optimisation of system sizes and mass for a given performance level. This is obviously true of any of the embodiments of the present invention.

Additionally, the mode decoupling device 100 in FIG. 2 includes optional resilient members shown as coil springs 133 and 134. These can be used to provide a stiffness to motion of the piston rod assembly and therefore provide a warp stiffness to the hydraulic system. Preferably however, they are used to provide a force to bias the position of the piston rod assembly centrally within the two primary chambers 121 and 122.

As described above, each fluid volume in the hydraulic system includes a compression conduit, a rebound conduit, a connecting conduit and a mode decoupling device balance chamber. Each fluid volume may also include at least one accumulator, although this is not necessary if other sources of compliance are available, for example if the fluid is compressible or if the conduits (or portions of the conduits) expand an appropriate amount with pressure change.

The volume of the fluid and gas in the hydraulic system changes with temperature. In some cases, this leads to an unacceptable change in the properties of the system due to stiffness change and/or friction (which is in turn partially dependent on operating pressure). Therefore, also shown in FIG. 2 is a pressure maintenance system including a pressure maintenance device 139. Pressure maintenance device 139 includes a pump 139P, a tank 139T and fluid flow control devices 140-143.

As the hydraulic system is not the primary means of support (i.e. the coil springs or air, torsion, etc. springs provide a large portion of the vehicle support) all four fluid volumes in the system can be operated at a common static pre-charge pressure. The advantage of operating all systems at the same static pre-charge pressure is that static pressure differentials across piston seals throughout the system are eliminated thereby reducing roll attitude changes caused by fluid leakage between the volumes. A powered control system which can pump fluid between the volumes, while it may be optional, it is not essential. The two pressure control functions that are desirable are pressure equalisation between the fluid volumes and maintaining of the average pressure of the fluid volumes within a tolerance of the desired operating pressure.

Therefore, in FIG. 2, the four fluid volumes are connected via flow control devices 140-143 to a common conduit or passage 144 which is in turn connected to the pressure maintenance device 139. In its simplest form, each flow control device is a restriction, typically a micro orifice with filters either side to prevent blockage, although any known restrictive means may be used such as a capillary line or a block of porous material. If orifices are used, they are generally sized to provide the characteristics required to maintain the pressures in the four fluid volumes within an acceptable range whilst preventing significant fluid flow during cornering to maintain the static roll moment distribution and stiffness and to maintain the roll attitude within an acceptable range when returning to straight line running. Alternatively, the flow control devices 140-143 may be valves to selectively communicate the fluid volumes with the pressure maintenance device. The valves can be solenoid actuated valves for example, electrically controlled in dependence on any combination of vehicle condition signals such as vehicle speed, steering angle, steering rate, lateral acceleration, one or more pressures in the hydraulic system, ambient temperature or the temperature of one or more components of the vehicle or the hydraulic system.

Although the pressure maintenance device 139 may be omitted, changes in the volumes of fluid and gas in the hydraulic system and its accumulators through the operating temperature range of the vehicle are usually large enough to require some form of compensation device. The complexity of this device can vary significantly, depending on the design parameters and the functionality required.

In its simplest form, the pressure maintenance device (139) can be a fluid pressure accumulator with any known construction (for example bladder-type with gas spring, piston-type with gas spring or with mechanical spring).

Alternatively the pressure maintenance device (139) can use a fluid pressure source (such as a tank with a pump, or another vehicle system such as the power steering) to maintain the pressure in the hydraulic suspension volumes to either a fixed or a variable pressure. If a fixed pressure is chosen, the components required can be simple, cheap, passive, mechanical parts, however as the system temperature changes, the system stiffness will change slightly. To maintain the system stiffness characteristics constant with varying temperature, the pressure in the systems must be adjusted in dependence on their temperature, which generally requires one or more temperature sensors, at least one variable pressure switch or pressure transducer and an electronic control unit.

Also, the roll stiffness of the hydraulic suspension system can be adjusted by changing the pressure in the systems, so if a pressure maintenance device (139) with variable pressure set-points is used, the pressure can be varied in dependence on the load in the vehicle and/or by a driver operated mode selector or a variable selector. For rapid adjustment of the pressure in the systems, valves are preferable to restrictions alone between the pressure maintenance device and the four fluid volumes.

One alternative is for the pressure maintenance device to regulate to two different pressures. This could be done by using valves to control the pressure in the four fluid volumes in pairs. Alternatively the pressure maintenance device could be connected to two of the fluid volumes with valves to bridge across between each of the pressure regulated volumes and another fluid volume, or the pressure maintenance device may include two accumulators, each connected to two fluid volumes through flow control devices. Regulating different pairs of fluid volumes gives control of different parameters. For example, if the front fluid volumes are regulated to a different pressure to the rear fluid volumes then the front to rear push out forces of the rams may be different compared to the case where, using the same system component sizing, all four volumes are regulated to the same pressure. Changing the roll stiffness of the hydraulic system can change the RMD of the total suspension system when the support spring RMD is different to the hydraulic system RMD. The roll stiffness and pitch attitude may be controlled by independently controlling the pressures in the front fluid volumes and the rear fluid volumes. This can be done in dependence on any signals such as, for example, driving style sensors, driver selectable control inputs, vehicle load sensors and/or vehicle load position sensors. Alternatively, if the two left fluid volumes are regulated to different pressure to the two right fluid volumes, then the hydraulic system can be used to react a roll moment on the vehicle, for example a static roll load due to an offset payload in the vehicle.

Alternatively, or additionally, the pressure in the four hydraulic volumes may be controlled at a higher frequency in dependence on steering and handling measures to actively control roll attitude and/or pitch attitude. The components (pump, tank, valves, sensors and controllers for many different algorithms) for these types of control are well known.

Figure 3:
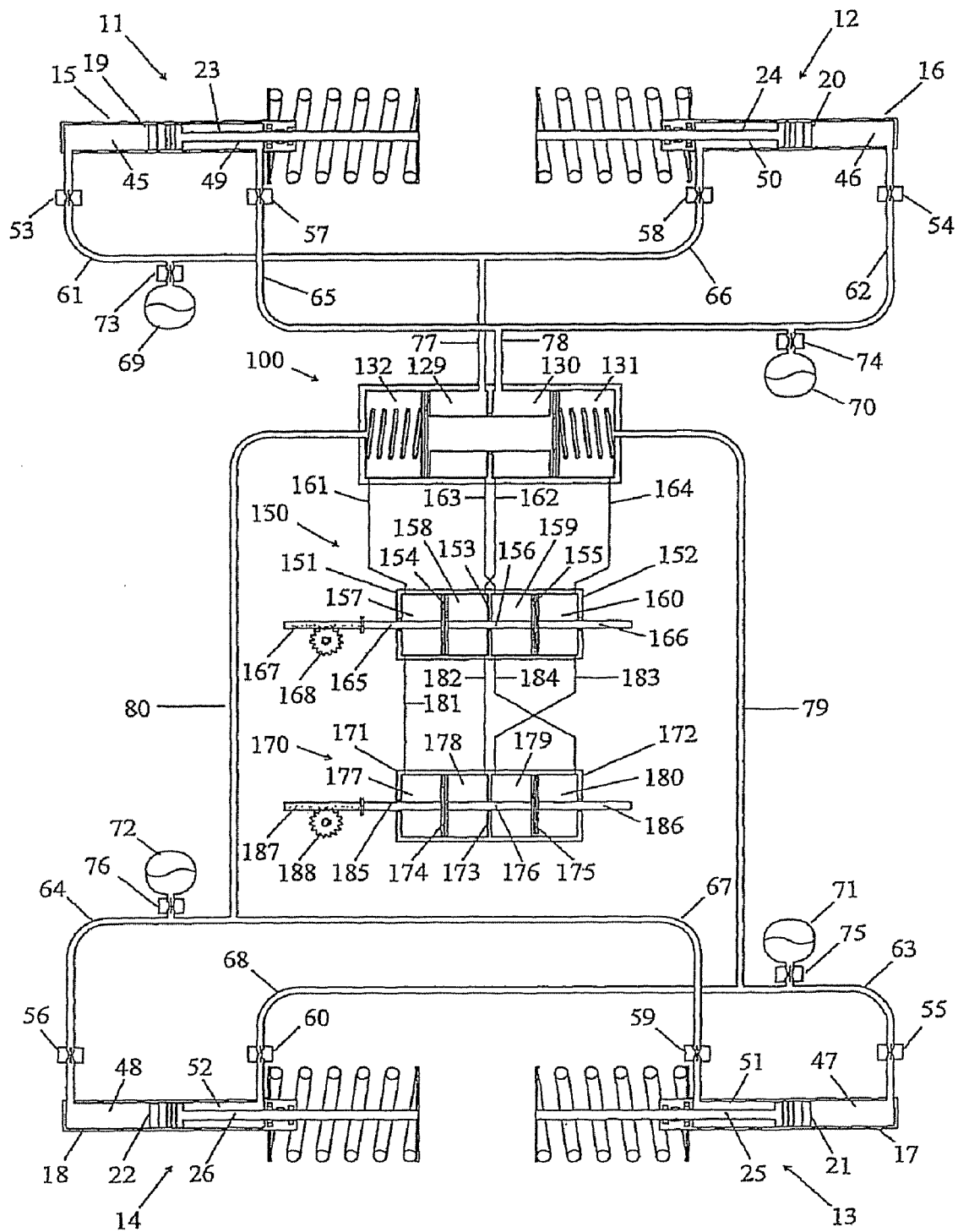
FIG. 3 is a schematic view of a variation to the second preferred embodiment of the hydraulic system incorporating active control of roll stiffness and roll moment distribution.

FIG. 3 shows an alternative form of active control for the hydraulic system of the present invention. Two fluid displacement devices 150 and 170 are shown to effect controlled displacement of fluid between the four fluid volumes.

The first fluid displacement device comprises two primary chambers 151 and 152, separated by a fixed wall 153. Each primary chamber is divided into two control chambers (157 and 158, 159 and 160) by a respective piston 154, 155 fixed to either end of a central rod 156 which passes through the fixed wall 153. Control conduits connect the control chambers of the first fluid displacement device to the balance chambers of the mode decoupling device 100 such that motion of the pistons 154, 155 and central rod 156 displace into the fluid volumes on one side of the vehicle and out of the fluid volumes on the opposite side of the vehicle to adjust the roll attitude of the vehicle. In FIG. 3 the control conduits connecting the control chambers of the first fluid displacement device to the four hydraulic volumes of the hydraulic system are shown connecting the control chambers of the second fluid displacement device to the balance chambers of the mode decoupling device 100 for clarity, but they may obviously be connected to any point in each of the four fluid volumes of the hydraulic system.

Since the first fluid displacement device can be used to control the roll attitude of the vehicle, it can be called a roll attitude fluid displacement device. The control chambers therein can be called roll attitude control chambers. Then in the connection sequence shown in FIG. 3, the rear left roll attitude control chamber 157 is connected to the rear left balance chamber 132, the front right roll attitude control chamber 158 is connected to the front right balance chamber 130, the front left roll attitude control chamber 159 chamber is connected to the front left balance chamber 129 and the rear right roll attitude control chamber 160 is connected to the rear right balance chamber 131.

A control rod 165 is fixed to the opposite side of the first piston 154, passing through control chamber 157. A matching dummy rod 166 is connected to the opposite side of the second piston 155 passing through control chamber 160. The control rod 165 includes a toothed portion or rack 187 enabling the position of the piston rod assembly of the roll attitude fluid displacement device to be controlled by driving the rotation of the gear wheel or pinion 188. The position of the piston rod assembly may be driven by any other known arrangement (for example additional hydraulic chambers into which the control rod and the dummy rod protrude, the volume of fluid in the hydraulic chambers being controlled).

It should be readily appreciated that the connection sequence between the roll attitude fluid displacement device and the four fluid volumes of the hydraulic system can be changed whilst achieving the same functionality. This can be used to permit different relative displacements front and rear if required, using either a different diameter central rod 156, or if chambers 158 and 160 are swapped for example (so that 158 is now the rear right roll attitude control chamber and 160 is now the front right roll attitude control chamber) by changing the diameter of one of the primary chambers 151 or 152. It can be desirable in some applications to transfer a different amount of fluid between the two front fluid volumes compared to between the two rear fluid volumes, depending on the ram sizing and motion ratios front to rear.

The second fluid displacement device comprises two primary chambers 171 and 172, separated by a fixed wall 173. Each primary chamber is divided into two control chambers (177 and 178, 179 and 180) by a respective piston 174, 175 fixed to either end of a central rod 176 which passes through the fixed wall 173. Control conduits connect the control chambers of the second fluid displacement device to the balance chambers of the mode decoupling device 100 such that motion of the pistons 174, 175 and central rod 176 displace into the fluid volumes at one end of the vehicle and out of the fluid volumes at the opposite end of the vehicle to adjust the pitch attitude of the vehicle by increasing the pressure in the fluid volumes at one end of the vehicle and reducing the pressure in the fluid volumes at the opposite end of the vehicle. In FIG. 3 the control conduits connecting the control chambers of the second fluid displacement device to the four hydraulic volumes of the hydraulic system are shown connecting the control chambers of the second fluid displacement device 170 to the control chambers of the first fluid displacement device 150 for clarity, but they may obviously be connected to any point in each of the four fluid volumes of the hydraulic system.

Since the second fluid displacement device can be used to control the pitch attitude of the vehicle, it can be called a pitch attitude fluid displacement device. The control chambers therein can be called pitch attitude control chambers. Then in the connection sequence shown in FIG. 3, the rear left pitch attitude control chamber 177 is connected to the rear left roll attitude control chamber 157, the front right pitch attitude control chamber 178 is connected to the front right roll attitude control chamber 158, the rear right pitch attitude control chamber 179 chamber is connected to the rear right roll attitude control chamber 160 and the front left pitch attitude control chamber 180 is connected to the front left roll attitude control chamber 159.

A control rod 185 is fixed to the opposite side of the first piston 174, passing through control chamber 177. A matching dummy rod 186 is connected to the opposite side of the second piston 175 passing through control chamber 180. The control rod 185 includes a toothed portion or rack 187 enabling the position of the piston rod assembly of the roll attitude control fluid displacement device to be controlled by driving the rotation of the gear wheel or pinion 188. The position of the piston rod assembly may be driven by any other known arrangement.

It should be readily appreciated that the connection sequence between the pitch attitude control fluid displacement device and the four fluid volumes of the hydraulic system can be changed whilst achieving the same functionality.

It can be desirable to produce different relative fluid volume displacements front and rear. For example, if the fluid volumes transferred (out of the fluid volumes at one end of the vehicle and into the fluid volumes at the other end of the vehicle) do not match the other system stiffness settings, then the roll stiffness can be affected (which may be done deliberately to positive effect). Additionally it is possible to increase and decrease the pressure in the two fluid volumes at one end of the vehicle only (i.e. provide a roll moment distribution fluid displacement device with only two control chambers which vary in volume in the same direction as each other for controlling the pressures in for example the rear fluid volumes). This will change the roll stiffness in addition to changing the pitch attitude which can be desirable as noted in the applicant's International Patent Application Number PCT/AU02/01331 and can be controlled actively at a relatively high frequency as with the two illustrated fluid displacement devices, or even at lower frequency in dependence on load and/or load position.

One arrangement that allows easy sizing of different effective areas is to remove the dummy rod 166, 186 from either fluid displacement means 150 or 170 (advantageously negating the need for an associated rod seal out of the end of the primary chamber 152 or 172), then use a control rod (165 or 185) of larger diameter than the central rod (156 or 176) and use a larger diameter for the primary chamber (151 or 171) including the control rod (165 or 185) than for the other primary chamber (152 or 172). In this way, it is possible to size the control and central rods and the two primary chambers of a device to match pairs the effective area of pairs of chambers as previously discussed. Indeed this arrangement is preferred for construction of each fluid displacement device, the equal component size embodiments shown in the figures being used for more ready understanding of the concepts.

It should be noted that while two fluid displacement devices are shown in the figure, further variations are possible. For example, only one fluid displacement means may be provided to control roll attitude without separate control of pitch attitude.

A pressure maintenance device of any type (as described above) may be used with this arrangement to maintain or control the average static operating pressure in each fluid volume. One advantage of utilising fluid displacement devices to provide active control of the roll attitude and/or pitch attitude is that the pressure maintenance device may be of its most simple passive form of one accumulator connected to the four fluid volumes through respective flow control devices.

Figure 4:
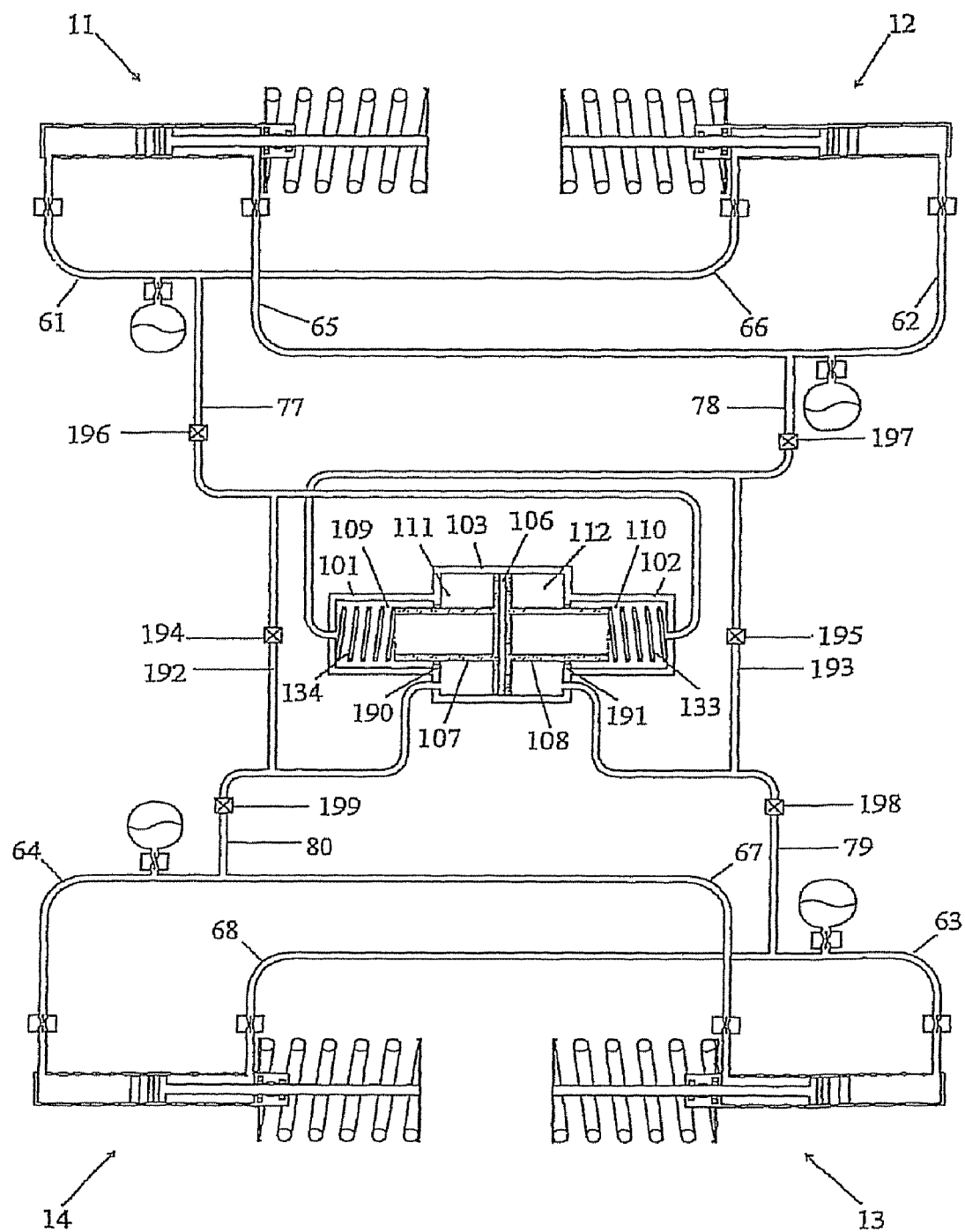
FIG. 4 is a schematic view of a variation to the first preferred embodiment of the hydraulic system, including additional valves and conduits.

A further alternative arrangement of the mode decoupling device 100 is shown in FIG. 4. This embodiment is similar to FIG. 1 in the layout of the mode decoupling device having a central cylinder portion 103 and two end cylinder portions 101 and 102, but these end cylinder portions are now separated from the central cylinder portion by walls 190 and 191. The central piston 106 is similarly located in the central cylinder portion 103, but the rods 107 and 108 are of larger diameter and sealably pass through walls 109 and 191. This forms the same four chambers 109, 110, 111 and 112 in the mode decoupling device which are connected and operate in the same manner as in FIG. 1 for convenience. As is readily apparent it is possible to use any connection sequence that gives the same functionality.

The rods are shown as hollow pieces to save weight and material although they may be solid or filled with a lighter material than the rod material. The rods may alternatively or additionally include resilient members located inside and protruding from the ends of the rods to act as bump stops, cushioning the piston rod assembly towards the end of its travel.

Coil springs 133 and 134 are also shown as in FIGS. 2 and 3, acting on the piston rod assembly.

FIG. 4 also shows further optional additions to the hydraulic system of FIG. 2, although these additions may be applied to any embodiment of the system. Left and right longitudinal interconnection conduits 194 and 195 are provided to respectively connect the front left fluid volume to the rear left fluid volume and the front right fluid volume to the rear right fluid volume. These conduits effectively bypass the mode decoupling device 100 resulting in a similar fluid connectivity to the applicant's U.S. Pat. No. 6,761,371. In this case, the RMD of the hydraulic system is determined by the front and rear wheel ram diameters and their mounting arrangements, the mode decoupling device 100 no longer providing any effect on the steady state RMD. Valve devices 192 and 193 are provided in the longitudinal interconnection conduits to control the flow of fluid through said conduits. The valve devices may include restrictions, multi-stage or controlled damper valves and/or lockout valves.

If the valve devices 192 and 193 include lockout valves, then these lockout valves may be operated to switch the RMD of the system between the two settings (one determined by the wheel rams and the mode decoupling device, the other determined solely by the wheel rams). This may be done in response to sensed vehicle handling inputs, for example switching to a more forward biased RMD of the hydraulic system to encourage understeer, in which case the RMD of both settings can be determined by vehicle handling balance factors. Alternatively, one setting can be used to provide the desired handling balance of the vehicle (which typically results in a forward biased RMD of the hydraulic system) and the other setting can be used to provide a more even RMD for the vehicle to give reduced head toss and improved comfort for a given roll stiffness. Then the lockout valves can be controlled either automatically using sensed inputs (including vehicle speed, lateral acceleration, fluid pressures, steering angle and/or steering rate) to determine if the vehicle is travelling in a straight line or cornering, providing increased comfort over undulating surfaces in a straight line and providing the desired handling balance when cornering. The lockout valves may alternatively be manually or automatically controlled for on-road or off-road use as whilst both settings provide roll stiffness with no warp stiffness from the hydraulic system, off-road comfort (during large warp inputs) significantly benefits from a RMD which is reasonably balanced front to rear.

If the valve devices 194 and 195 include damping, then the dynamic RMD can be towards the RMD of the hydraulic system as if the conduits 192, 193 were completely blocked and the steady state roll RMD of the hydraulic system is as if the conduits were completely open. This can be an especially useful tool for fine tuning the front to rear balance of roll damping for the vehicle, which may need to be different to the RMD of the hydraulic system.

Although the longitudinal interconnection conduits (194, 195) and the associated valve devices (192, 193) are shown connecting between fluid volume connecting conduits (77 and 80 or 78 and 79), they may be connected between any point in each the four fluid volumes and may be incorporated into the mode decoupling device 100.

A further advantage of providing the longitudinal interconnection conduits 194 and 195 is that any pressure maintenance system provided can be two channel only (i.e. connected to only one of the left fluid volumes and one of the right fluid volumes) which not only reduces parts, but still permits roll attitude control.

Also shown in FIG. 4 are further valve devices 196, 197, 198 and 199 located in each fluid volume connecting conduit. These valve devices may include restrictions, multi-stage or controlled damper valves, but are preferably simple lockout valves. There are several advantages of using a lockout valve in each fluid volume connecting conduit, one advantage being the ability to isolate a large portion of one fluid volume from the rest of the hydraulic system in the case of a failure (i.e. if a loss of fluid pressure is detected in one of the fluid volumes, or if the fluid pressure does not match a mapped fluid pressure for the dynamic conditions on the vehicle, due to a system malfunction or component failure). If passive restriction type pressure maintenance is used, the lockout valve is ideally between the connection of the pressure maintenance conduit and the compression/rebound conduits of each fluid volume. Another advantage is the ability to control the use of the mode decoupling device 100, in which case only two lockout valves are required. It can be desirable to control the use of the mode decoupling device to revert to two independent pairs of front and rear systems which can have a different RMD to the other two settings discussed in relation to FIG. 4 in which case the control can be manual or automatic as discussed for those two settings. Alternatively or additionally it can be desirable to control the use of the mode decoupling device to remove the free warp feature of the hydraulic system for any reason such as wheel lift.

The further valve devices can be provided in alternative positions to those shown in FIG. 4, such as integrated into the mode decoupling device, or into a manifold block containing the accumulator damper valve(s).

Figure 5:
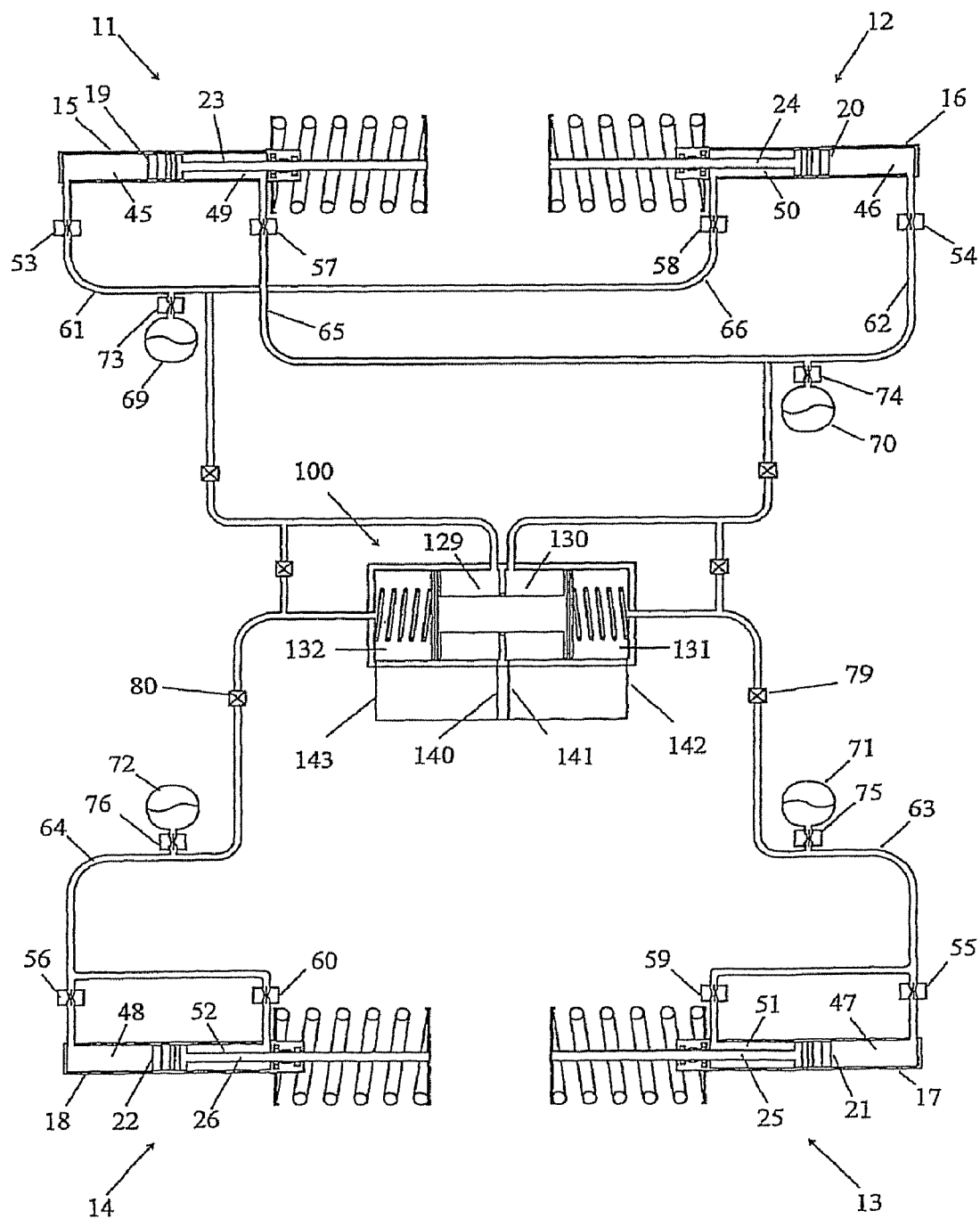
FIG. 5 is a schematic view of a third preferred embodiment of the present invention.

FIG. 5 shows a combination of the mode decoupling device from FIG. 2 and the valve options of FIG. 4, but also in this case shows single-acting wheel rams at the rear. Although the wheel rams at either or both ends of the vehicle can be single-acting, it is more common for the rear wheels of a front-engined vehicle to require lower roll stabilising forces than the front. The rams 13 and 14 and are shown with rebound chambers (51, 52) and damper valves (59, 60) still present as these are generally required to enable sufficient damping forces to be generated for the rear wheels in the rebound direction. The rebound chamber is shown connected to the respective compression conduit via the rebound damper valve. However, the damper valve may be incorporated into the piston (21, 22) of each rear ram, as commonly constructed in conventional shock absorbers.

Also in FIG. 5, an arrangement of restrictions 140-143 are shown interconnecting the four fluid volumes. This can be used to permit very low frequency equalisation of pressure between the four fluid volumes where the need for a fluid pressure source or accumulator is low. These interconnections can be replaced by restrictions between adjacent balance chambers of the mode decoupling devices.

Figure 6:
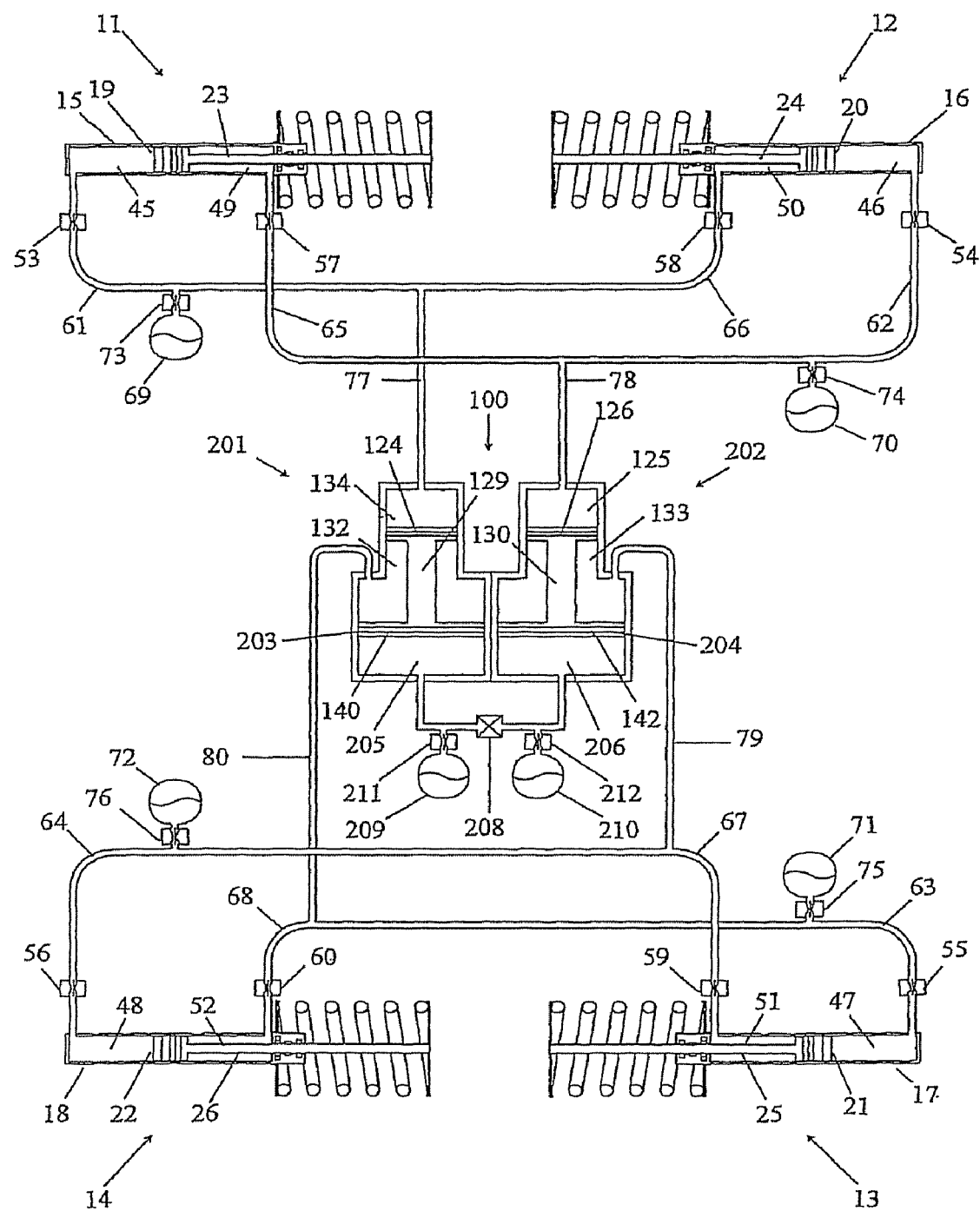
FIG. 6 is a schematic view of a fourth preferred embodiment of the present invention.

FIG. 6 shows additional modifications and improvements to the hydraulic system of FIG. 1. The pressure maintenance, active control and additional conduits and valves described for FIGS. 2, 3 and 4 are equally applicable to this embodiment of the invention. The mode decoupling device 100 is split into two similar halves 201 and 202 at the central piston, the two central piston halves 203 and 204 forming a left fluid pressure chamber 205 and a right fluid pressure chamber 206. The left and right fluid pressure chambers are connected by a conduit 207 to provide similar functionality to the system of FIG. 1. In addition, a valve 208 is located in the conduit to damp and/or preferably block fluid flow along the conduit between the left and right fluid pressure chambers. This valve can be used to control the use of the mode decoupling device with similar effect to the further valve devices 196, 197, 198 and 199 described in FIG. 4 (for failure, changing RMD, limiting or preventing wheel lift, etc.).

Optional accumulators 209 and 210 are also shown in FIG. 6. These accumulators provide additional heave resilience into the hydraulic system. This can be of value when the diameter of the rods of the wheel rams is larger for some reason (such as strength or to add support and pitch stiffness from the hydraulic system), the additional heave resilience reducing the heave stiffness of the hydraulic system while maintaining the roll stiffness and a pitch stiffness contribution from the front and rear rams (11 to 14) and accumulators (69 to 72). The additional heave resilience can be damped by optional accumulator damper valves 211 and 212.

Figure 7:
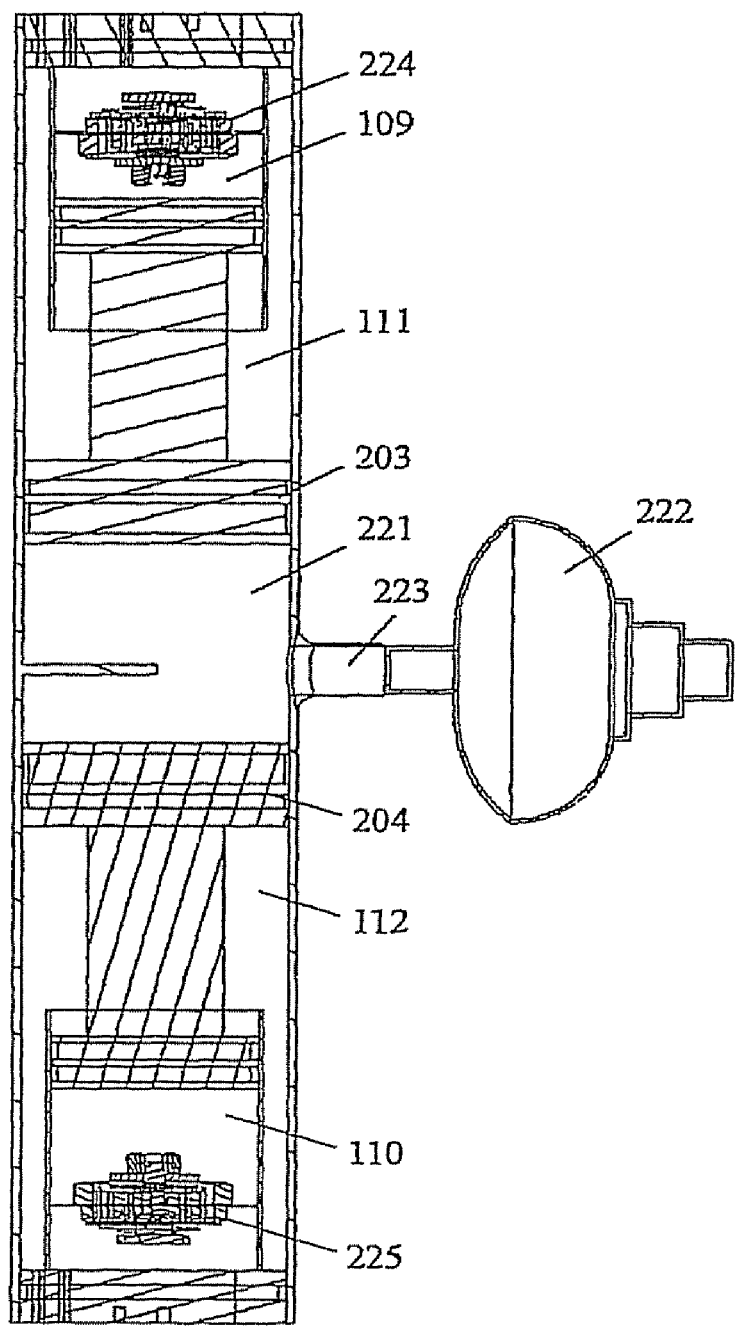
FIG. 7 is a section view of a fifth embodiment of a mode decoupling device according to the present invention.

FIG. 7 shows a further modification to the mode decoupling device 100. The piston rod assembly of the mode decoupling device of FIG. 1 is split in a similar manner to in FIG. 6 resulting in two central piston halves 203 and 204 forming a central fluid pressure chamber 221. Resilience is added to this central fluid pressure chamber by an accumulator 222 which is in fluid communication with the central fluid pressure chamber via a conduit 223. The conduit 223 may include a damper means and/or any other valve means including a lockout valve (not shown). This arrangement simply adds heave resilience as in FIG. 6. Additionally damper valves 224 and 225 may be added between the mode decoupling device chambers 109, 110 and the remainder of the respective fluid volumes. These additional damper valves provide a small amount of heave damping, but primarily provide warp damping which can be beneficial. The use of these dampers, located in the mode decoupling device and acting between the mode decoupling device and the fluid volumes is an example of the integration of the further valve devices 196, 197, 198 and 199 described in FIG. 4.

Many other obvious alterations to the basic arrangement of the components whilst maintaining the connection sequence essential for the functionality of the hydraulic system are considered to fall within the scope of this application. For example, it is obvious that, in a production design of the system, it is possible to incorporate not only the wheel damper valves (53-60) into the main body of the wheel ram, but also the accumulators and the accumulator damper valves. For example, the front left wheel ram may include the wheel damper valves 53 and 57, the accumulator 69 and the accumulator damping 73.

The wheel damper valves may be located further away from the chambers of the wheel rams and may even be located in a manifold which provides the accumulator damper valves, the accumulator and even the junctions between the compression, rebound and connecting conduits. Similarly, the accumulators may be located away from the wheel rams, the front accumulators being located in the engine bay for example, or at any other point in the associated fluid volume even on the connecting conduits or integrated into the mode decoupling device or simply under the body of the vehicle for improved packaging and cooling.

Although throughout the figures the accumulators shown are of the hydro-pneumatic type, as discussed earlier, any form of fluid pressure accumulation means may be used, such as hose that expands with fluid pressure, As already discussed it can be desirable to change the roll stiffness of the hydraulic system, however there are many simple known methods to achieve this rather then the pressure control discussed above. For example, to permit switching of the roll stiffness of the hydraulic system additional accumulators may be provided in the front or rear fluid volumes or in all four fluid volumes. A lockout valve may be provided for each additional accumulator, the lockout valve being manually controlled, or automatically controlled using inputs such as vehicle speed, lateral acceleration, fluid pressures, steering angle and/or steering rate. The additional accumulators may or may not be damped.

An alternative to hydraulically switching a whole accumulator in and out of communication with the fluid volumes, is to use an accumulator design with two gas volumes, then simpler, smaller, cheaper gas switching valves can be used to vary the gas volumes available to the systems by switching the lock-out valve to between the two gas volumes to isolate one of the volumes.

A further alternative method to switch the roll stiffness is to employ 'bridging valves' which connect at least two (i.e. the front left and front right and/or rear left and rear right) fluid volumes together. This method can be employed more cheaply (only the bridging valves are required), but it can remove all roll stiffness and the roll damping effect of the accumulator damper valves from the hydraulic system. Generally, it is cheapest to connect the bridging valves between the conduits of the front fluid volumes and/or the conduits of the rear fluid volumes. A further alternative is to design a controlled switchable or variable bypass valve into the piston between the compression and rebound chamber of each wheel ram. As this effectively short-circuits the system, it reduces fluid flow through the system greatly and can give the best comfort performance given the low fluid accelerations. Ideally the control is electronic, sensing inputs such as steering angle and/or steering velocity, vehicle speed and lateral acceleration. Other inputs such as wheel velocity can be beneficial, even if the bypass maintains the effect of the wheel damper valves as with reduced roll stiffness comes reduced single-wheel stiffness and different damping requirements.

Throughout all of the preceding drawings, the accumulator damper valves, or indeed any damper valve positioned in the hydraulic system, may be passive or controlled, the control being of any known form, from a simple switched damper valve to a completely continuously variable damper valve. The simple switched damper valve may be of any known type such as a switchable bypass around each roll damper valve or a simple controlled bleed orifice.

Indeed at every point where there is a damper indicated in the figures, that damper valve can be either: a single damper valve having the same characteristics in both directions; a single valve having different characteristics from one direction of fluid flow to the other; a single valve having flow restriction characteristics in one direction and being relatively free-flowing in the opposite direction; two single-acting valves, one damper valve to control the restriction to flow in one direction and a second damper valve to control the restriction to flow in the opposite direction, the two valves being used in parallel, or in series with a non-return valve in parallel with each valve as is known in conventional damper valve technology.

It can be preferable to use two accumulator damper valves between each accumulator and the system, one acting in the opposite direction to the other and optionally offering different restriction characteristics. If the flow into the accumulators is less restricted by an accumulator compression damper valve compared to the restriction of flow out of the accumulator provided by an accumulator rebound damper valve, the vehicle height can be temporarily reduced as the vehicle rolls and the position of the dynamic roll axis of the suspension can be adjusted. It should however be noted that it is also possible to use only one accumulator damper valve either providing bi-directional restriction or providing damping in one direction only. For example, if accumulator rebound direction damping only is provided (or if the accumulator compression direction damper valve is omitted) then again the vehicle height will temporarily reduced as the vehicle rolls.

If additional load support and/or very little roll stiffness is required from the hydraulic system at one end of the vehicle, the wheel rams may be single-acting rams. The single acting rams may include a compression and a rebound chamber with the piston of the wheel ram being a damper valve to provide rebound and optionally some compression damping for associated wheels. An example of this can be found in the applicant's International Patent Application number PCT/AU02/00028, details of which are incorporated herein by reference.

The hydraulic system can be yawed through ninety degrees to provide pitch stiffness in place of roll stiffness. The mode decoupling device still removes the warp stiffness from the hydraulic system, the system permitting a high pitch stiffness to be used without impacting the roll heave or warp stiffness of the base suspension to which the hydraulic system is applied.

Wheels may be any form of surface engaging means such as skis, tracks, floats for engaging any commonly traversed surface such as railway or tram tracks, tarmac or other road or pavement, mud, sand, water, snow or ice.

The claims defining the invention are as follows:

1. A suspension system for a vehicle, the vehicle including a vehicle body and at least two forward and two rearward wheel assemblies, the suspension system including front and rear resilient vehicle support means between the vehicle body and the two forward and two rearward wheel assemblies respectively, for providing resilient support of at least a portion of the vehicle body above the wheel assemblies, and a hydraulic system, the hydraulic system including:

at least one front left, at least one front right, at least one rear left and at least one rear right wheel ram each located between a respective said wheel assembly and the vehicle body, each wheel ram including at least a compression chamber; and a mode decoupling device, the device including first, second, third and fourth balance chambers formed by an arrangement of at least two cylinder portions and a piston rod assembly, the first and fourth balance chambers varying in volume in the same direction as each other with motion of the piston rod assembly, the third and second balance chambers varying in volume in the same direction as each other and in the opposite direction to the first and fourth balance chambers with motion of the piston rod assembly; wherein the compression chamber of the front left wheel ram is in constant fluid communication with the first balance chamber of the mode decoupling device forming a front left fluid volume, the compression chamber of the front right wheel ram is in constant fluid communication with the second balance chamber forming a front right fluid volume, the compression chamber of the rear left wheel ram is in fluid communication with the third balance chamber forming a rear left fluid volume and the compression chamber of the rear right wheel ram is in fluid communication with the fourth balance chamber of the mode decoupling device forming a rear right fluid volume, such that the piston rod assembly of the mode decoupling device operates to proportion fluid pressure during roll motions of the vehicle, and operates to distribute fluid between the respective fluid volumes during warp motions, heave motions or warp and heave motions;

each front wheel ram further includes a respective rebound chamber and the compression chamber of one front wheel ram is in fluid communication with the rebound chamber of a laterally adjacent wheel ram; or each rear wheel ram further includes a respective rebound chamber wherein the compression chamber of one rear wheel ram is in fluid communication with the rebound chamber of a laterally adjacent wheel ram;

the mode decoupling device includes three cylinder portions and the piston rod assembly includes a first central piston and at least two rods;

the mode decoupling device includes a second central piston, the first and second central pistons forming at least one fluid pressure chamber; and the suspension system further comprises:

at least one fluid pressure accumulator in fluid communication with the at least one fluid pressure chamber.

2. A suspension system according to claim 1 wherein the vehicle is primarily supported by the resilient vehicle support means.

3. A suspension system according to claim 1 wherein the vehicle support means includes first support means at a first end of the vehicle and/or at a second end of the vehicle, the first support means supporting at least a portion of the load on the vehicle and providing roll stiffness.

4. A suspension system according to claim 1 wherein the vehicle support means includes second support means at a first end of the vehicle and/or at a second end of the vehicle, the second support means supporting at least a portion of the load on the vehicle and providing substantially zero roll stiffness.

5. A suspension system according to claim 1 further including damping means for damping the flow of fluid into, out of or into and out of at least one chamber of each wheel ram.

6. A suspension system according to claim 1 further including at least one fluid pressure accumulator for each of said fluid volumes, each accumulator being in fluid communication with the respective fluid volume.

7. A suspension system according to claim 6 wherein damping means may be provided for damping the flow of fluid into, out of or into and out of at least one accumulator.

8. A suspension system according to claim 1 further including resilient means acting on the piston rod assembly of the mode decoupling device.

9. A suspension system according to claim 1 wherein the mode decoupling device includes two cylinder portions and the piston rod assembly includes two pistons and at least one rod.

10. A suspension system according to claim 1 wherein the piston rod assembly further includes two end pistons.

11. A suspension system according to claim 1 further including a pressure maintenance device connected to at least two of the fluid volumes through respective restrictions or valves.

12. A suspension system according to claim 11 wherein the pressure maintenance device is a fluid pressure accumulator connected through a restriction to each fluid volume.

13. A suspension system according to claim 11 wherein the pressure maintenance device includes a pump, a tank and fluid flow control devices.

14. A suspension system according to claim 13 wherein the pressure is controlled to be different in the left fluid volumes to the right fluid volumes to provide roll attitude control.

15. A suspension system according to claim 13 wherein the pressure is controlled to be different in the front fluid volumes to the rear fluid volumes to provide pitch attitude control.

16. A suspension system for a vehicle, the vehicle including a vehicle body and at least two forward and two rearward wheel assemblies, the suspension system including front and rear resilient vehicle support means between the vehicle body and the two forward and two rearward wheel assemblies respectively, for providing resilient support of at least a portion of the vehicle body above the wheel assemblies, and a hydraulic system, the hydraulic system including:
  at least one front left, at least one front right, at least one rear left and at least one rear right wheel ram each located between a respective said wheel assembly and the vehicle body, each wheel ram including at least a compression chamber; and
  a mode decoupling device, the device including first, second, third and fourth balance chambers formed by an arrangement of at least two cylinder portions and a piston rod assembly, the first and fourth balance chambers varying in volume in the same direction as each other with motion of the piston rod assembly, the third and second balance chambers varying in volume in the same direction as each other and in the opposite direction to the first and fourth balance chambers with motion of the piston rod assembly; wherein
  the compression chamber of the front left wheel ram is in constant fluid communication with the first balance chamber of the mode decoupling device forming a front left fluid volume, the compression chamber of the front right wheel ram is in constant fluid communication with the second balance chamber forming a front right fluid volume, the compression chamber of the rear left wheel ram is in fluid communication with the third balance chamber forming a rear left fluid volume and the compression chamber of the rear right wheel ram is in fluid communication with the fourth balance chamber of the mode decoupling device forming a rear right fluid volume, such that the piston rod assembly of the mode decoupling device operates to proportion fluid pressure during roll motions of the vehicle, and operates to distribute fluid between the respective fluid volumes during warp motions, heave motions or warp and heave motions;
  each front wheel ram further includes a respective rebound chamber and the compression chamber of one front wheel ram is in fluid communication with the rebound chamber of a laterally adjacent wheel ram; or each rear wheel ram further includes a respective rebound chamber wherein the compression chamber of one rear wheel ram is in fluid communication with the rebound chamber of a laterally adjacent wheel ram;
  the suspension system further including at least one bridging valve to selectively interconnect the left fluid volumes and at least one bridging valve to selectively interconnect the right fluid volumes to thereby bypass the effect of the mode decoupling device.

17. A suspension system according to claim 16 wherein the vehicle is primarily supported by the resilient vehicle support means.

18. A suspension system according to claim 16 wherein the vehicle support means includes first support means at a first end of the vehicle and/or at a second end of the vehicle, the first support means supporting at least a portion of the load on the vehicle and providing roll stiffness.

19. A suspension system according to claim 16 wherein the vehicle support means includes second support means at a first end of the vehicle and/or at a second end of the vehicle, the second support means supporting at least a portion of the load on the vehicle and providing substantially zero roll stiffness.

20. A suspension system according to claim 16 further including damping means for damping the flow of fluid into, out of or into and out of at least one chamber of each wheel ram.

21. A suspension system according to claim 16 further including at least one fluid pressure accumulator for each of said fluid volumes, each accumulator being in fluid communication with the respective fluid volume.

22. A suspension system according to claim 21 wherein damping means may be provided for damping the flow of fluid into, out of or into and out of at least one accumulator.

23. A suspension system according to claim 16 further including resilient means acting on the piston rod assembly of the mode decoupling device.

24. A suspension system according to claim 16 wherein the mode decoupling device includes two cylinder portions and the piston rod assembly includes two pistons and at least one rod.

25. A suspension system according to claim 16 wherein the mode decoupling device includes three cylinder portions and the piston rod assembly includes a first central piston and at least two rods.

26. A suspension system according to claim 25 wherein the piston rod assembly further includes two end pistons.

27. A suspension system according to claim 16 further including a pressure maintenance device connected to at least two of the fluid volumes through respective restrictions or valves.

28. A suspension system according to claim 27 wherein the pressure maintenance device is a fluid pressure accumulator connected through a restriction to each fluid volume.

29. A suspension system for a vehicle, the vehicle including a vehicle body and at least two forward and two rearward wheel assemblies, the suspension system including front and rear resilient vehicle support means between the vehicle body and the two forward and two rearward wheel assemblies respectively, for providing resilient support of at least a portion of the vehicle body above the wheel assemblies, and a hydraulic system, the hydraulic system including:
  at least one front left, at least one front right, at least one rear left and at least one rear right wheel ram each located between a respective said wheel assembly and the vehicle body, each wheel ram including at least a compression chamber; and
  a mode decoupling device, the device including first, second, third and fourth balance chambers formed by an arrangement of at least two cylinder portions and a piston rod assembly, the first and fourth balance chambers varying in volume in the same direction as each other with motion of the piston rod assembly, the third and second balance chambers varying in volume in the same direction as each other and in the opposite direction to the first and fourth balance chambers with motion of the piston rod assembly; wherein
  the compression chamber of the front left wheel ram is in constant fluid communication with the first balance chamber of the mode decoupling device forming a front left fluid volume, the compression chamber of the front right wheel ram is in constant fluid communication with the second balance chamber forming a front right fluid volume, the compression chamber of the rear left wheel ram is in fluid communication with the third balance chamber forming a rear left fluid volume and the compression chamber of the rear right wheel ram is in fluid communication with the fourth balance chamber of the mode decoupling device forming a rear right fluid volume, such that the piston rod assembly of the mode decoupling device operates to proportion fluid pressure during roll motions of the vehicle, and operates to distribute fluid between the respective fluid volumes during warp motions, heave motions or warp and heave motions;

each front wheel ram further includes a respective rebound chamber and the compression chamber of one front wheel ram is in fluid communication with the rebound chamber of a laterally adjacent wheel ram; or each rear wheel ram further includes a respective rebound chamber wherein the compression chamber of one rear wheel ram is in fluid communication with the rebound chamber of a laterally adjacent wheel ram;

the suspension system further including at least one bridging valve to selectively interconnect the front fluid volumes, at least one bridging valve to selectively interconnect the rear fluid volumes or at least one first bridging valve to selectively interconnect the front fluid volumes and at least one second bridging valve to selectively interconnect the rear volumes to thereby remove the roll stiffness of the hydraulic system.

30. A suspension system according to claim 29 wherein the vehicle is primarily supported by the resilient vehicle support means.

31. A suspension system according to claim 29 wherein the vehicle support means includes first support means at a first end of the vehicle and/or at a second end of the vehicle, the first support means supporting at least a portion of the load on the vehicle and providing roll stiffness.

32. A suspension system according to claim 29 wherein the vehicle support means includes second support means at a first end of the vehicle and/or at a second end of the vehicle, the second support means supporting at least a portion of the load on the vehicle and providing substantially zero roll stiffness.

33. A suspension system according to claim 29 further including damping means for damping the flow of fluid into, out of or into and out of at least one chamber of each wheel ram.

34. A suspension system according to claim 29 further including at least one fluid pressure accumulator for each of said fluid volumes, each accumulator being in fluid communication with the respective fluid volume.

35. A suspension system according to claim 34 wherein damping means may be provided for damping the flow of fluid into, out of or into and out of at least one accumulator.

36. A suspension system according to claim 29 further including resilient means acting on the piston rod assembly of the mode decoupling device.

37. A suspension system according to claim 29 wherein the mode decoupling device includes two cylinder portions and the piston rod assembly includes two pistons and at least one rod.

38. A suspension system according to claim 29 wherein the mode decoupling device includes three cylinder portions and the piston rod assembly includes a first central piston and at least two rods.

39. A suspension system according to claim 38 wherein the piston rod assembly further includes two end pistons.

40. A suspension system according to claim 29 further including a pressure maintenance device connected to at least two of the fluid volumes through respective restrictions or valves.

41. A suspension system according to claim 40 wherein the pressure maintenance device is a fluid pressure accumulator connected through a restriction to each fluid volume.

* * * * *